United States Patent [19]

Simons

[11] 4,300,946
[45] Nov. 17, 1981

[54] GRANULATING AND ACTIVATING METAL TO FORM METAL HYDRIDE

[75] Inventor: Harold M. Simons, Orem, Utah

[73] Assignee: Billings Energy Corporation, Independence, Mo.

[21] Appl. No.: 173,833

[22] Filed: Jul. 30, 1980

Related U.S. Application Data

[63] Continuation of Ser. No. 40,053, May 17, 1979, abandoned.

[51] Int. Cl.³ .......................... B22F 9/00; C01B 3/00; C01B 6/00; C01B 6/02
[52] U.S. Cl. .................................. 75/0.5 B; 423/644; 423/645; 423/647; 423/648 R; 241/18; 241/23; 241/27
[58] Field of Search ....... 423/644, 645, 647, DIG. 15; 34/15; 75/0.5 B, 0.5 BA, 0.5 BB; 241/18, 23, 27

[56] References Cited

U.S. PATENT DOCUMENTS

| | | | |
|---|---|---|---|
| 1,435,928 | 11/1922 | Kipper | 423/DIG. 15 |
| 3,180,711 | 4/1965 | Aconsky | 423/645 |
| 4,021,183 | 5/1977 | Gillis et al. | 423/645 |
| 4,040,410 | 8/1977 | Libowitz | 423/645 |
| 4,147,536 | 4/1979 | Asumi et al. | 423/644 |

*Primary Examiner*—Herbert T. Carter
*Attorney, Agent, or Firm*—Thorpe, North, Western & Gold

[57] ABSTRACT

A metal material, which is capable of reacting with hydrogen to form a metal hydride, is simultaneously granulated and conditioned with hydrogen to activate the metal material to a state in which it is capable of readily reacting with and absorbing hydrogen. The granulation and activation are achieved by heating the metal material to a temperature of at least about 200° F. and treating the heated metal material with hydrogen, while concurrently subjecting the metal material to mechanical impact to reduce the average particle size thereof to less than about 1 centimeter.

3 Claims, No Drawings

GRANULATING AND ACTIVATING METAL TO FORM METAL HYDRIDE

This application is a continuation, of application Ser. No. 40,053 filed May 17, 1979, now abandoned.

BACKGROUND OF THE INVENTION

1. Field

This invention pertains to granulating metal materials which are capable of reacting with and absorbing hydrogen, and to conditioning or activating the metal material to its state in which it will readily react with and absorb hydrogen.

2. State of the Art

The storage of hydrogen in the form of a granular metal hydride has several advantages over other storage methods such as cryogenic storage of liquid hydrogen or pressurized storage of gaseous hydrogen. Primarily, it is a safe, efficient method of storing hydrogen. The device for storing hydrogen as a metal hydride is commonly referred to as a hydride reservoir, which consists of a pressure vessel or container filled with a granular metal material capable of being converted to a metal hydride. The container is provided with a hydrogen gas connection and a means of handling the thermal load encountered during hydriding (reaction with and absorption of hydrogen) and dehydriding (decomposition of metal hydride and release of hydrogen).

Heretofore, the metal material which was to be utilized in the hydride vessel or container was ground into small particles having a size of about one millimeter or less using conventional reduction equipment capable of handling very hard material. The granular metal material then required conditioning before a practical forward rate of hydriding can be attained. This conditioning involves an activation of the metal material to a state in which it is capable of readily reacting with and absorbing hydrogen. The conditioning involves heating the metal material, subjecting the material to a vacuum to outgas the surface thereof, and flushing the vacuumed material with hydrogen gas which apparently further cleans the particle surfaces of the metal material and initiates a hydriding reaction. However, at the temperature at which the conditioning is accomplished, there is relatively little hydrogen actually absorbed by the metal material. Nevertheless, it is evident from the changes occurring in the metal material that a reaction does occur during the conditioning stage. Severe embrittlement of the metal material occurs, and an appreciable breakdown in particle size takes place (see publication BNL 50589, November 1976 from Brookhaven National Laboratories) during the conditioning stage. Generally, the conditioning stage must be repeated in cyclic fashion to obtain adequate activation, i.e., a second cycle, and usually subsequent cycles, of vacuuming the material and then flushing the material with hydrogen are required following the initial vacuuming and flushing.

3. Objectives

The principal objective of the present invention was to provide a process for simultaneously granulating and conditioning the metal material, whereby the reduction apparatus heretofore necessary in grinding the very hard metal material is eliminated. Another objective was to achieve activation more effectively and more efficiently.

SUMMARY OF THE INVENTION

The above objectives are achieved in accordance with the present invention by a process wherein the metal material, having an average particle size greater than about 1 centimeter, is heated to a temperature of at least about 200° F., and the heated metal material is treated with hydrogen. Concurrently, the metal material is subjected to mechanical impact sufficient to reduce the average particle size of the material to less than about 1 centimeter.

The metal material is advantageously a member selected from the group consisting of iron, titanium, nickel, rare-earth metals, calcium, magnesium, manganese, and mixtures or alloys thereof. Metal alloys which are applicable include iron-titanium alloys, lanthanum-nickel alloys, calcium-nickel alloys, mischmetal-nickel alloys, manganese-nickel alloys, manganese-iron-titanium alloys, and mischmetal-calcium-nickel alloys.

In a preferred embodiment, the heating and hydrogen treatment are performed within a rotary ball mill, with the ball mill being rotated to subject the metal material to mechanical impact. The ball mill can contain a plurality of balls made of a material which is substantially harder than the metal material which is being heated and treated with hydrogen.

The activating mechanism which occurs as the metal material is treated with hydrogen also produces a profound change in the physical properties of the metal material. The metal material tends to develop stresses within the particles causing fractioning of the material along the stress boundaries. The material becomes extremely fragile and can be broken into fine particles with minimal mechanical impact.

When the metal material is broken into small particles in the presence of hydrogen, the newly created surfaces of the small particles have not been contaminated with surface contaminants such as oxygen and water. The small particles of metallic material readily react with hydrogen to form the activated metallic hydride material which is capable of reversibly absorbing large quantities of hydrogen. In contrast, when the metal material is ground to small particle size on conventional reduction equipment, the material must be subjected to a vacuum followed by heating in the presence of hydrogen, with the vacuuming and hydrogen treatment being repeated numerous times before the material is capable of reversibly absorbing its maximum amount of hydrogen. In accordance with the present invention, the same effect is achieved in the single activation which occurs simultaneously with the particle reduction.

DETAILED DESCRIPTION OF THE PREFERRED EMBODIMENTS

A metal material selected from the group consisting of iron, titanium, nickel, rare earth metals, calcium, magnesium, manganese, and mixtures or alloys thereof is simultaneously granulated and activated to a state in which it is capable of readily reacting with and absorbing hydrogen when contacted with hydrogen at a given temperature and pressure and of releasing hydrogen when either the temperature is increased above the given temperature, the pressure is reduced below the given pressure, or the temperature is increased above the given temperature and the pressure is concurrently reduced below the given pressure. The activation and particle size reduction is accomplished by heating the metal material having a particle size greater than about 1 centimeter to a temperature of at least about 200° F. The heated metal material is then treated with hydrogen while concurrently being subjected to mechanical impact sufficient to reduce the average particle size of the material to less than about 1 centimeter. The hydrogen and mechanical impact treatment can, of course, be started anytime during the period in which the material is being heated. The duration of the hydrogen and mechanical impact treatment depends on the initial particle size of the metal material. Chunks of material up to about 1 meter or more in diameter can be processed according to this invention if appropriate means are provided for subjecting the chunk of material to mechanical impact.

In a preferred embodiment of the invention, the metal material is placed in a rotary ball mill. As the ball mill rotates, the material is heated and treated with hydrogen. Alternatively, the material can be heated in a separate heating means, with the heated material being fed to the ball mill for treatment with the hydrogen. The rotation of the ball mill produces mechanical impact between particles of the material and between the material and the internal surfaces of the ball mill. The ball mill may also contain a plurality of balls made of material which is substantially harder than the metal material which has been heated and treated with hydrogen.

In the heat and hydrogen treatment, the metal material is heated to a temperature of between about 200° F. and 1000° F., and subjected to hydrogen at a hydrogen partial pressure of between about 1 atmosphere and 50 atmospheres. Just prior to the hydrogen treatment, the metal material is advantageously subjected to a vacuum in order to outgas the surface of the material. Flushing of the material with an inert gas such as argon can also be effective in outgasing the material prior to the hydrogen treatment.

Whereas, this invention is described with respect to particular embodiments, it is to be understood that changes may be made therein and other embodiments constructed without departing from the novel inventive concepts set forth in the claims which follow.

We claim:

1. A method for simultaneously granulating a metal material selected from the group consisting of iron, titanium, nickel, rare earth metals, calcium, magnesium, manganese, and mixtures or alloys thereof, and conditioning or activating the metal material in a single activation step, said method comprising:

subjecting the metal material to a vacuum to outgas the surface of the material of any impurity gases;

heating the metal material to a temperature of at least about 200° F., said metal material having a particle size greater than about 1 centimeter;

treating the metal material with hydrogen to activate the metal material to a state in which it is capable of readily reacting with and absorbing hydrogen when contacted with hydrogen at a given temperature and pressure and of releasing hydrogen when either the temperature is increased above the given temperature, the pressure is reduced below the given pressure or the temperature is increased above the given temperature and the pressure is concurrently reduced below the given pressure, and concurrently subjecting the metal material to a mechanical impact to break up the material.

2. A method in accordance with claim 1, wherein the metal material is flushed with an inert gas while the metal material is being subjected to a vacuum.

3. A method in accordance with claim 1 further comprising the step of concurrently subjecting the metal material to mechanical impact sufficient to reduce its average particle size to less than about 1 centimeter.

* * * * *